(12) United States Patent
Sadinski et al.

(10) Patent No.: US 12,398,757 B2
(45) Date of Patent: Aug. 26, 2025

(54) SKEW LIMITING BEARING CAGE

(71) Applicant: THE TIMKEN COMPANY, North Canton, OH (US)

(72) Inventors: Robert J. Sadinski, Uniontown, OH (US); William Hannon, Hudson, OH (US)

(73) Assignee: THE TIMKEN COMPANY, North Canton, OH (US)

( * ) Notice: Subject to any disclaimer, the term of this patent is extended or adjusted under 35 U.S.C. 154(b) by 99 days.

(21) Appl. No.: 18/551,507

(22) PCT Filed: Apr. 15, 2022

(86) PCT No.: PCT/US2022/024952
§ 371 (c)(1),
(2) Date: Sep. 20, 2023

(87) PCT Pub. No.: WO2022/221620
PCT Pub. Date: Oct. 20, 2022

(65) Prior Publication Data
US 2024/0167513 A1 May 23, 2024

Related U.S. Application Data

(60) Provisional application No. 63/175,886, filed on Apr. 16, 2021.

(51) Int. Cl.
*F16C 33/46* (2006.01)
*F16C 19/36* (2006.01)

(52) U.S. Cl.
CPC ........ *F16C 33/4676* (2013.01); *F16C 19/364* (2013.01)

(58) Field of Classification Search
CPC .......................... F16C 33/467; F16C 33/4676
See application file for complete search history.

(56) References Cited

U.S. PATENT DOCUMENTS

| 3,963,285 A | 6/1976 | Kellstrom |
| 4,065,191 A | 12/1977 | Kellstrom |

(Continued)

FOREIGN PATENT DOCUMENTS

| DE | 212013000259 U1 | 7/2015 |
| GB | 820204 A | 9/1959 |

(Continued)

OTHER PUBLICATIONS

International Search Report and Written Opinion for Application No. PCT/US2022/024952 dated Jul. 15, 2022 (9 pages).

(Continued)

*Primary Examiner* — James Pilkington
(74) *Attorney, Agent, or Firm* — Michael Best & Friedrich LLP

(57) ABSTRACT

A rolling element bearing assembly includes a rolling element bearing assembly cage for spacing a plurality of rolling elements during operation of the rolling element bearing assembly about a central rotation axis. The cage includes a first axial end ring, a second axial end ring, and a plurality of bridges extending between the first axial end ring and the second axial end ring. The plurality of bridges defining roller pockets therebetween. At least one of the plurality of bridges includes a Rayleigh step array disposed on a surface thereof. The surface facing an interior of the roller pocket.

19 Claims, 5 Drawing Sheets

(56) References Cited

U.S. PATENT DOCUMENTS

| | | | |
|---|---|---|---|
| 4,502,740 A * | 3/1985 | Ohura | F16C 33/4676 |
| | | | 29/898.067 |
| 4,629,339 A | 12/1986 | Morinaga | |
| 5,538,348 A | 7/1996 | Honda et al. | |
| 6,425,182 B1 | 7/2002 | Honda et al. | |
| 7,144,162 B2 | 12/2006 | Kumar et al. | |
| 8,092,097 B2 * | 1/2012 | Ohashi | F16C 33/6681 |
| | | | 384/470 |
| 9,140,303 B2 | 9/2015 | Dittmar et al. | |
| 9,850,953 B2 | 12/2017 | Tokunaga | |
| 9,995,341 B2 | 6/2018 | Koganei et al. | |
| 10,378,580 B2 | 8/2019 | Hayashi et al. | |
| 10,473,220 B2 | 11/2019 | Tokunaga et al. | |
| 10,487,877 B2 | 11/2019 | Volcansek et al. | |
| 10,605,303 B2 | 3/2020 | Soga | |

FOREIGN PATENT DOCUMENTS

| | | |
|---|---|---|
| JP | 2000104730 A | 4/2000 |
| JP | 2000205271 A | 7/2000 |
| JP | 2007177837 A | 7/2007 |
| JP | 2008202753 A | 9/2008 |
| JP | 2008291890 A | 12/2008 |
| JP | 2011094765 A | 5/2011 |
| JP | 2013217453 A | 10/2013 |
| JP | 2019060434 A | 4/2019 |

OTHER PUBLICATIONS

Cameron, "Stepped pads. Rayleigh step", Basic Lubrication Theory, 1981, Ch. 6.3, pp. 133-135.

Szeri, "Tribology: Friction, Lubrication, and Wear", 1980, pp. 126-129.

Stachowiak et al., "Engineering Tribology 3rd Edition", 2005, pp. 128-129.

Japanese Patent Office Action for Application No. 2023-558602 dated May 9, 2024 (17 pages including English translation).

Japanese Patent Office Action for Application No. 2023-558602 dated Jan. 29, 2025 (12 pages including English translation).

* cited by examiner

SKEW LIMITING BEARING CAGE

CROSS-REFERENCE TO RELATED APPLICATIONS

This application claims priority to U.S. Provisional Patent Application No. 63/175,886, filed on Apr. 16, 2021, the entire content of which is incorporated herein by reference.

FIELD OF THE INVENTION

The present invention relates to bearing assemblies, and more particularly to a bearing assembly including a bearing cage configured limit rolling element skew.

BACKGROUND OF THE INVENTION

The majority of bearing assemblies have no means to control the orientation of the rolling elements during operation. In some instances, high speed operation can cause bearings to skew, creating excess friction and heat, thus damaging the bearing assembly.

SUMMARY OF THE INVENTION

The present invention provides, in one aspect, a rolling element bearing assembly cage for spacing a plurality of rolling elements during operation of a rolling element bearing assembly about a central rotation axis. The cage includes a first axial end ring, a second axial end ring, and a plurality of bridges extending between the first axial end ring and the second axial end ring. The plurality of bridges defining roller pockets therebetween. At least one of the plurality of bridges includes a Rayleigh step array disposed on a surface thereof. The surface facing an interior of the roller pocket.

The present invention provides, in another aspect, a cage for spacing a plurality of rolling elements in a rolling element bearing assembly containing a working fluid. The cage includes a first axial end ring, a second axial end ring, a central rotation axis extending centrally through the first axial end ring and the second axial end ring, and a plurality of roller pockets spaced circumferentially about the cage. Each of the plurality of roller pockets is configured to receive a rolling element therein. At least one of the plurality of roller pockets includes a Rayleigh step array configured to selectively generate a hydrodynamic force within the working fluid in response to a skew angle between a rotational axis of the rolling element within the roller pocket and the central rotation axis.

The present invention provides, in yet another aspect, a rolling element bearing assembly including an inner ring, an outer ring, a plurality of rolling elements disposed between the inner ring and the outer ring, and a cage disposed between the inner ring and the outer ring. The cage includes a plurality of roller pockets in which the rolling elements are located. The plurality of roller pockets are configured to circumferentially space the rolling elements about the rolling element bearing assembly. The roller pockets include Rayleigh step arrays configured to align the rolling elements within the roller pockets.

The present invention provides, in yet another aspect, a method of operating a rolling element bearing assembly. The method including providing an inner ring, an outer ring, a plurality of rolling elements disposed between the inner ring and the outer ring, and a cage configured to circumferentially space the plurality of rolling elements about the rolling element bearing assembly. The cage includes a plurality of roller pockets in which the rolling elements are located. Each roller pocket includes Rayleigh step arrays. The method further includes imparting relative rotation of the outer ring with respect to the inner ring with the rolling elements in rolling contact with the outer ring and the inner ring, and in response to skew of the rolling elements relative to a rotational axis of the rolling element bearing assembly, generating a hydrodynamic force on the rolling elements with the Rayleigh step arrays.

Other features and aspects of the invention will become apparent by consideration of the following detailed description and accompanying drawings.

DETAILED DESCRIPTION

Figure 1:
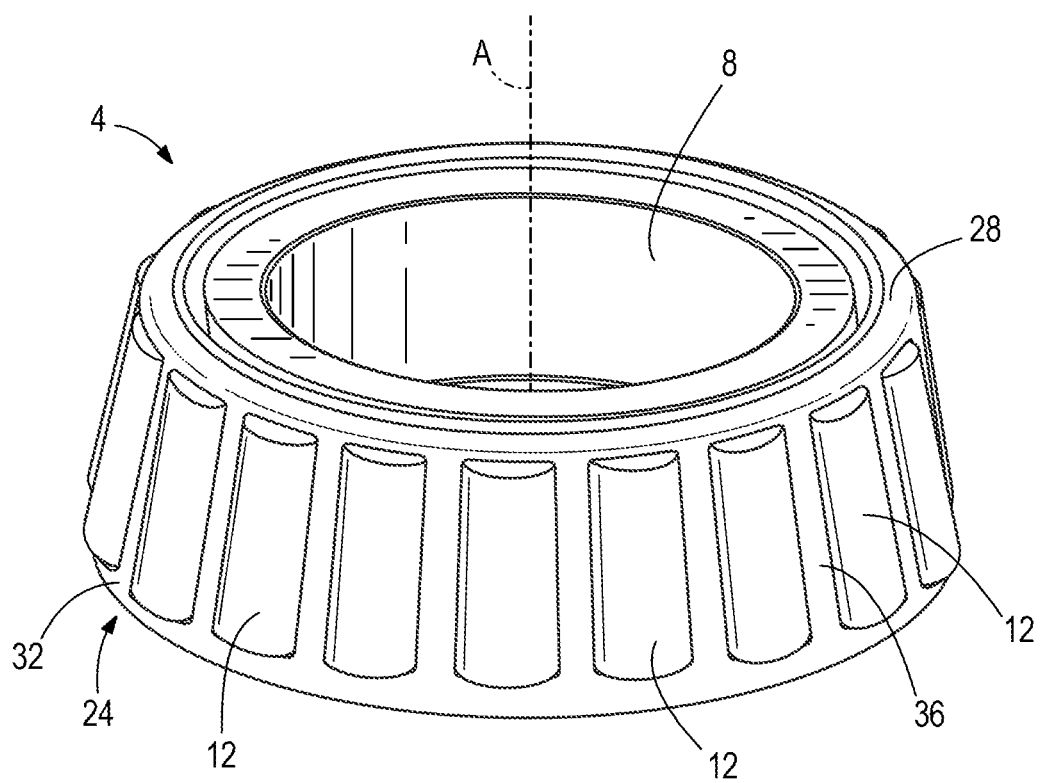
FIG. 1 is perspective view of a bearing assembly.
Figure 2:
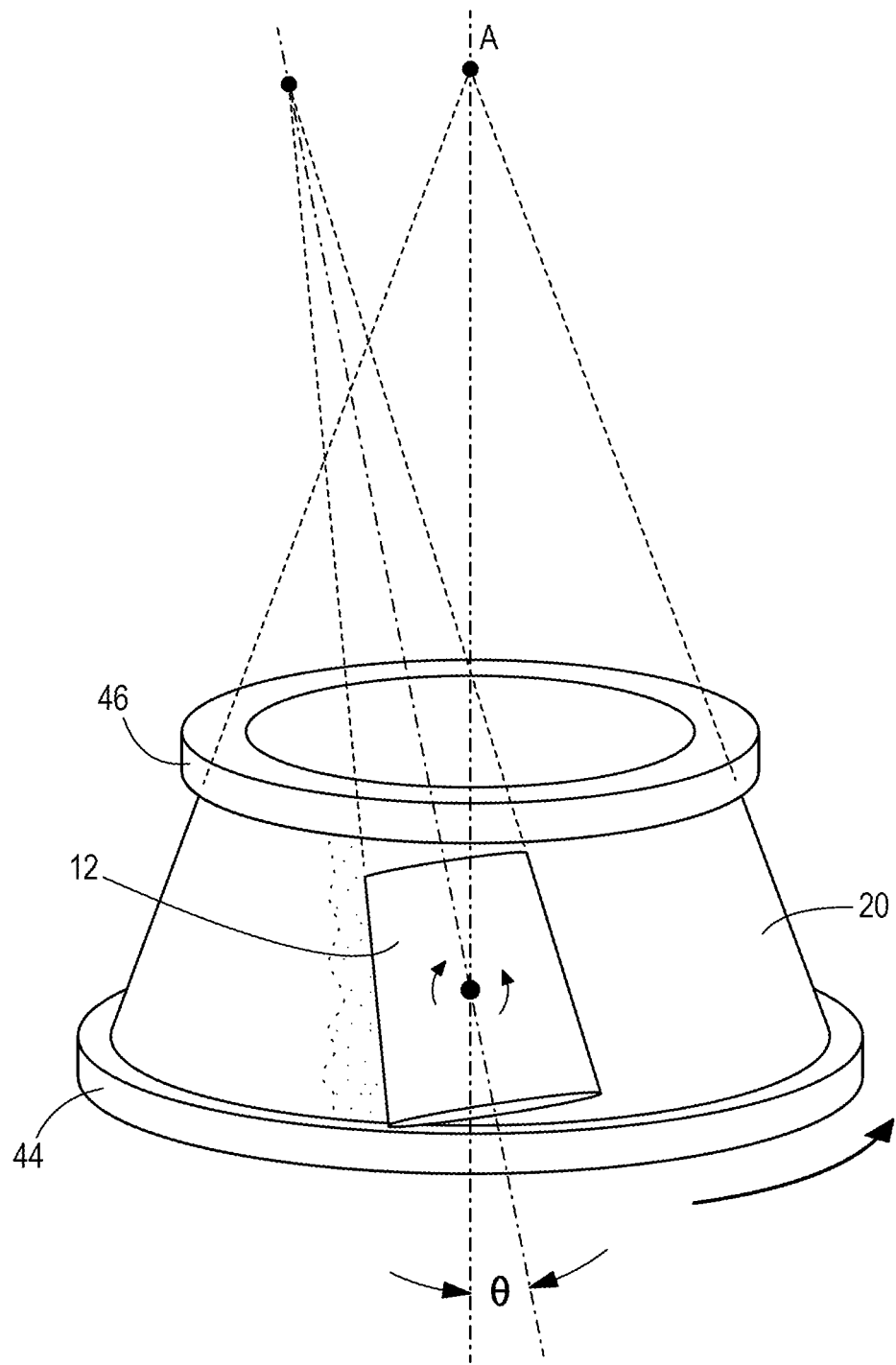
FIG. 2 is a schematic view of a bearing assembly showing rolling element skew.
Figure 6:
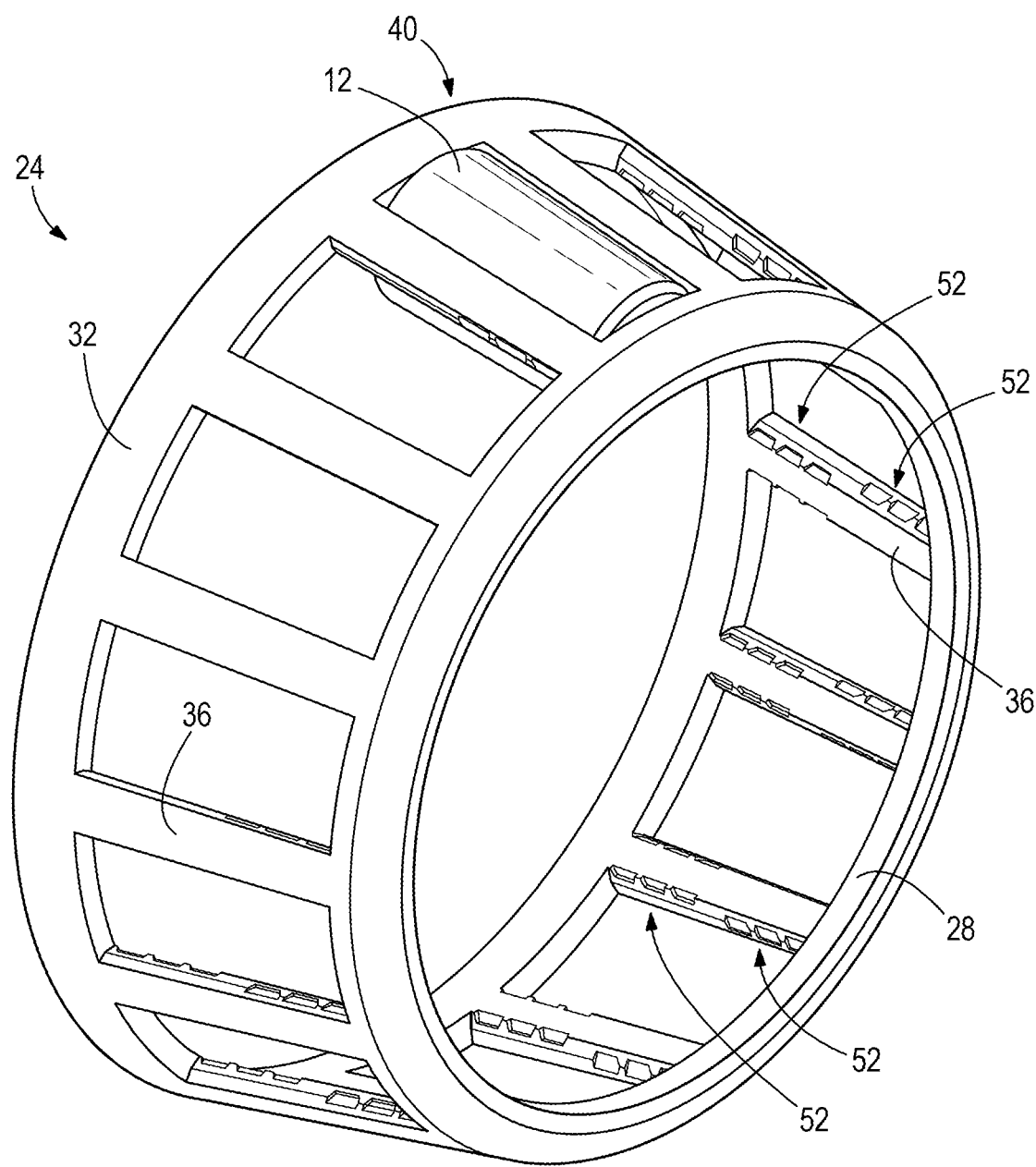
FIG. 6 is a perspective view of a bearing cage, including a single rolling element, according to one embodiment of the present disclosure Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIG. 1 depicts a bearing assembly 4 including an inner ring 8, an outer ring (not shown), and a plurality of circumferentially distributed rolling elements 12 positioned between the inner and outer rings. The inner and outer rings share a common bearing axis A, which is the central rotational axis for the bearing assembly 4. Although a variety of applications are possible, the bearing assembly 4 provides low friction (i.e., rolling) support of a first component (e.g., a rotating shaft) within a second component (e.g., a stationary housing). The inner ring 8 includes a radially inner surface secured with the first component (not shown), and the outer ring includes a radially outer surface secured with the second component (not shown). Each of the rolling elements 12 defines a rolling surface 16 (FIG. 4) in contact with raceway surfaces of the inner and outer rings, respectively. The raceway surface 20 of the inner ring 8 is shown in FIG. 2. In the illustrated embodiment, the rolling elements 12 have tapered rolling surfaces 16, but other constructions (i.e., cylindrical) are optional. As shown in FIG. 1, a cage 24 extends circumferentially around the bearing axis A at a radial position that is between the inner ring 8 and the outer ring such that the cage 24 occupies a common radial position with the plurality of rolling elements 12. The cage 24 includes a pair of opposed axial rings 28, 32 and a plurality of bridges 36 extending generally axially between the two axial rings 28, 32. In some embodiments, one or both axial rings 28, 32 may include a flange (e.g., a bent or rolled portion). A roller pocket 40 is defined between each adjacent pair of bridges 36, and thus, the cage 24 maintains a predetermined spacing between adjacent pairs of the rolling elements 12 by locating a rolling element 12 within a roller pocket 40 (FIG. 6).

One or both of the inner and outer rings can include one or two ribs to retain the rolling elements 12 therein. For example, as shown in FIG. 2, the inner ring 8 includes two ribs 44, 46 that extend radially outward beyond the raceway surface 20 to overlap with the axial end faces 48 of the plurality of rolling elements 12 on both axial ends of the bearing assembly 4. The first rib 44 is referred to as the large rib as it is located at the larger diameter end of the bearing assembly 4. The second rib 46 is referred to as the small rib as it is located at the smaller diameter end of the bearing assembly 4. One of skill in the art will recognize that a variety of different rib configurations are optional. Whatever rib-roller interface exists, a potential for wear (e.g., metal-on-metal) exists as the bearing assembly 4 is in operation and the rolling elements 12 travel circumferentially with respect to the inner and outer rings. The interface between the large rib 44 and the rolling elements 12 experiences both rolling and sliding motion. Tractive forces generated at the rib-roller interface due to the combination of rolling and sliding motion can induce a skew angle $\theta$ on a rolling element 12 relative to the apex center A of the rolling element 12 and raceway 20 geometries (FIG. 2). The skew angle $\theta$ of the rolling element 12 can cause a lack of lubrication at interface between the large rib 44 and the rolling element 12, significantly increasing the frictional force associated with said interface. Conventional uses for tapered roller bearings typically operate in conditions where the effects of rolling element 12 skew are not a concern. In high speed operations, such as shaft positions in an electric vehicle powertrain, among others, the rotational speed required of a bearing assembly can surpass 15,000 RPM. At high rotational speeds, the tractive forces at the rib-roller interface can be great enough to cause the rolling element 12 to skew, starving the rolling element 12 of lubrication and damaging the bearing assembly 4. However, the cage 24 according to the present disclosure is provided with a geometry to counteract rolling element 12 skew as described in further detail below.

Figure 3:
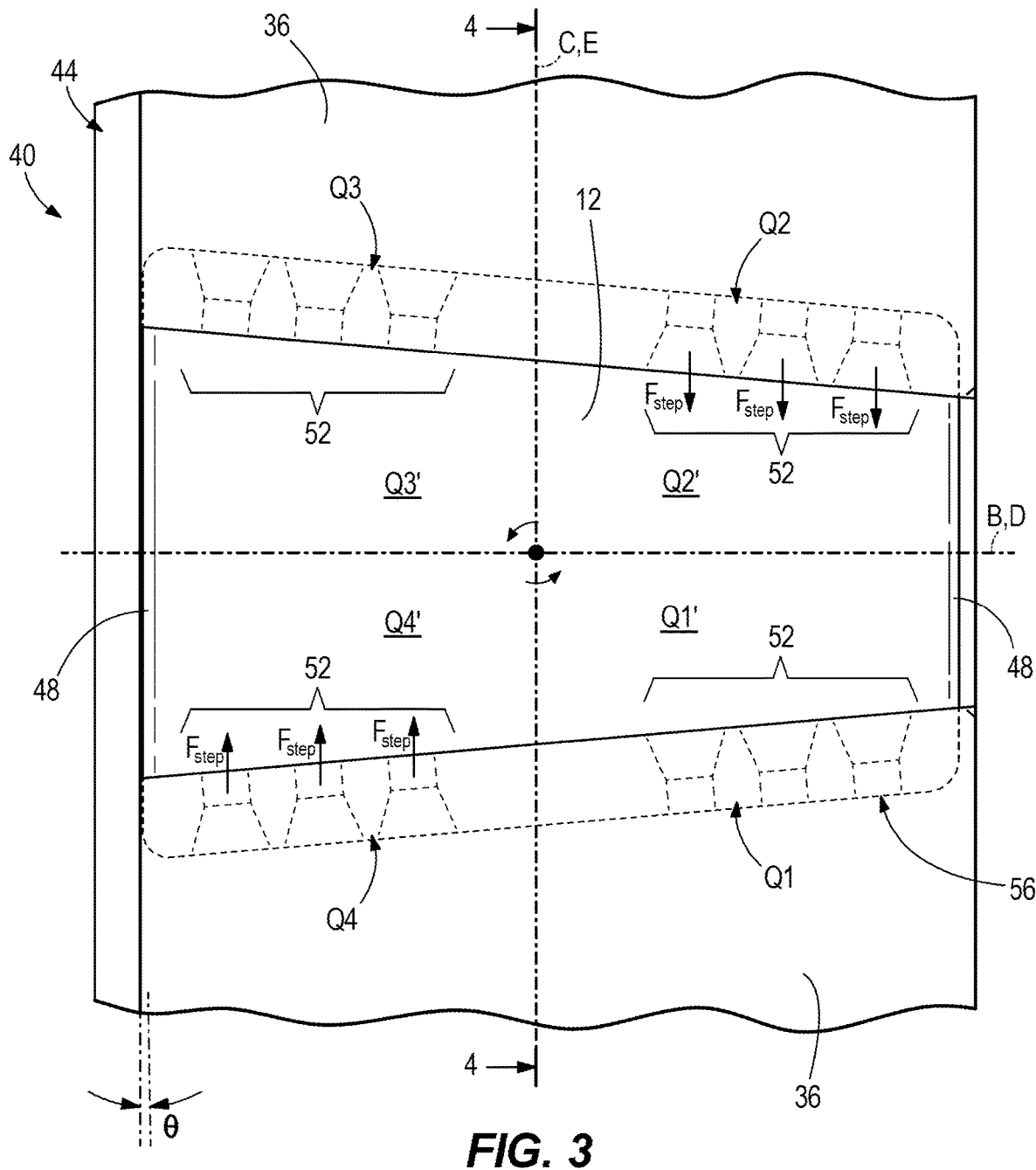
FIG. 3 is a side view of one roller pocket of the bearing assembly of FIG. 1.

FIG. 3 depicts a rolling element 12 within one roller pocket 40 of a bearing assembly cage 24. The roller pocket 40 is divided into four quadrants Q1, Q2, Q3, and Q4 by an axis B equidistant from and parallel to the cage bridges 36 and an axis C equidistant from and parallel to the opposed axial rings 28, 32 of the cage 24. The two axes B, C intersect at a point on the rolling element 12 about which the rolling element 12 is rotated when experiencing skew. Within each of the four quadrants Q1, Q2, Q3, and Q4 is a Rayleigh step array 52 that is disposed on an interior face 56 of the bridge 36 that faces and selectively interacts with the rolling element 12. The Raleigh step arrays 52 are spaced away from the axis C. In other words, the cage bridge 36 features a Rayleigh step array 52 at each end of the interior face 56 and proximate to the respective opposed axial rings 28, 32.

A Rayleigh step array 52 is a grouping of one or more Rayleigh step geometries positioned together and oriented such that they are activated at the same time. The geometry of a Rayleigh step in this disclosure follows the general shape of a traditional Rayleigh step and is used to generate a hydrodynamic force F on a rolling element 12. Dimensions of each feature of the Rayleigh step geometry can be tailored to the specific application. In the illustrated embodiment, each quadrant Q1, Q2, Q3, Q4 has one Rayleigh step array 52, each containing multiple Rayleigh step geometries. FIG. 6 depicts a perspective view of a bearing cage 24 including Rayleigh step arrays 52 on the cage bridges 36. In other embodiments, some quadrants can be provided without a Rayleigh step array or contain different numbers or arrangements of step geometries within the Rayleigh step array 52. For example, a bearing assembly that will only rotate in one direction can have Rayleigh step arrays 52 located in only one diagonal set of quadrants (e.g., the first and third quadrants Q1, Q3 and no Rayleigh step arrays in the second and fourth quadrants Q2, Q4), because the bearing assembly will only require skew to be countered in one direction. Likewise, a roller pocket 40 may be provided with a Rayleigh step array in only one of the quadrants if deemed effective for a suitable application. Within each quadrant that contains a Rayleigh step array 52, the step geometry is located such that the resultant hydrodynamic force generated when the arrays are activated acts with efficacy on the rolling element 12. The specific location of each Rayleigh step in an array 52 can vary based on available manufacturing techniques and the desired direction of the resultant hydrodynamic force from the array 52. The illustrated embodiment depicts the use of Rayleigh step arrays 52 on a single row tapered roller bearing assembly. However, the described Rayleigh step arrays 52 can be used on other bearing assemblies that utilize a cage and contains lubrication between the cage and rolling element surface. For example, cylindrical roller bearing assemblies, multi-row tapered roller bearing assemblies, and multi-row cylindrical roller bearing assemblies can all feature a cage with Raleigh step arrays according to aspects of the disclosure.

With respect to the rolling element 12 disposed within the roller pocket 40, the Rayleigh step arrays 52 are located at positions on the bridge 36 that correspond to four quadrants Q1', Q2', Q3', and Q4' on the surface of the rolling element 12. The four rolling element quadrants Q1', Q2", Q3", and Q4' are divided by a rotational centerline D of the rolling element 12 and an axis E parallel to the axial end faces 48 of the rolling element 12 and equidistant from said end faces 48. Each quadrant Q1', Q2', Q3", and Q4' is configured to interface with a Rayleigh step array 52 located in the corresponding quadrant Q1-Q4 of the roller pocket 40 to selectively receive a hydrodynamic force F from the Rayleigh step arrays 52. When a rolling element 12 is unskewed, the roller quadrants Q1'-Q4' are aligned with the roller pocket quadrants Q1-Q4 and a clearance gap between the rolling element 12 and the surfaces 56 having the Rayleigh step arrays 52 is at or above a threshold value. When a rolling element 12 experiences a skew angle $\theta$ (FIGS. 5A and 5B) the quadrants of Q1-Q4 are misaligned from the quadrants Q1'-Q4' and the clearance gap between the rolling element 12 and the cage surfaces 56 is below the threshold value within one diagonal quadrant pair. Below the threshold value, the Rayleigh step array 52 transitions from hydrodynamically dormant to hydrodynamically activated as described further below.

Figure 4:
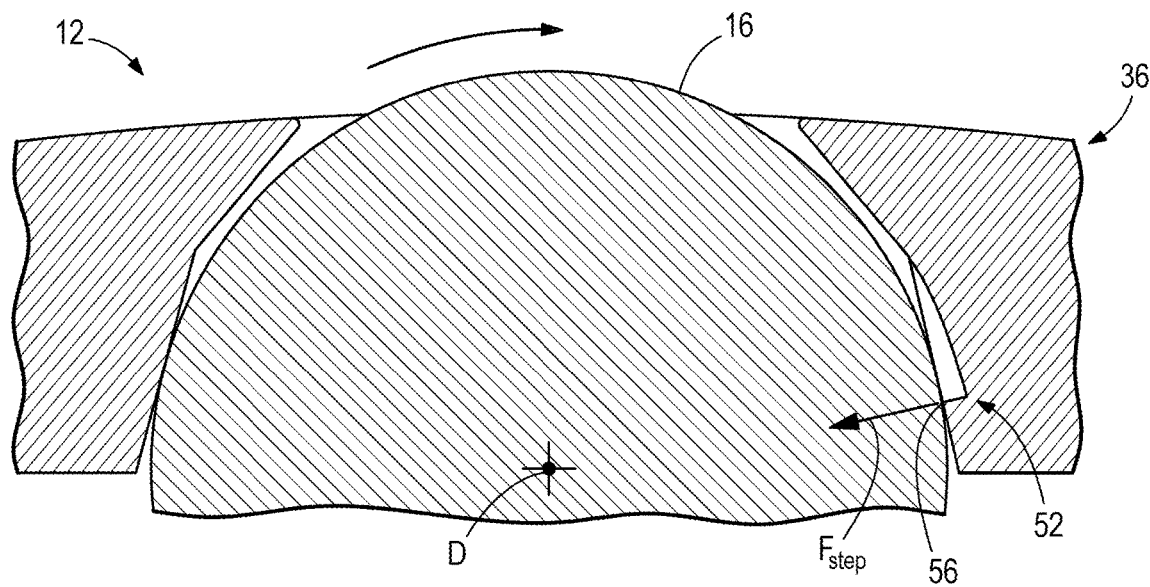
FIG. 4 is a cross-sectional view taken along section line 4-4 in FIG. 3.

FIG. 4 depicts a portion of one of the rolling elements 12 as viewed along the bearing axis A. As seen from this view, the Rayleigh step array 52 is located such that the hydrodynamic force F generated acts approximately tangent to the raceway 20 at the roller centerline D. The tangential component of the hydrodynamic force F generated by the Rayleigh step 52 is responsible for counteracting rolling element skew in the illustrated embodiment.

The bearing assembly 4 of the present disclosure utilizes a running lubricant. Traditionally lubricants are used within bearing assemblies to limit the frictional forces associated with operation. Lubrication in the bearing assembly 4 of the present disclosure is also responsible for interacting with the Rayleigh step arrays 52 as a working fluid in which the hydrodynamic F is generated in response to rolling element skew. The Rayleigh step arrays 52 described herein are passive geometries, included on the bridges 36 of the cage 24, that interact with the lubricant and a second surface (i.e., the rolling element surface 16) to generate a hydrodynamic force F. Existence of the hydrodynamic force F is dependent upon the lubricant being disposed between the rolling elements 12 and the cage bridge surfaces 56 containing the Rayleigh step arrays 52, and the relative velocity of the rolling elements 12 and Rayleigh step arrays 52. Increased relative velocity between the rolling elements 12 and the Rayleigh step arrays 52 results in a greater hydrodynamic force F being generated.

Figure 5A:
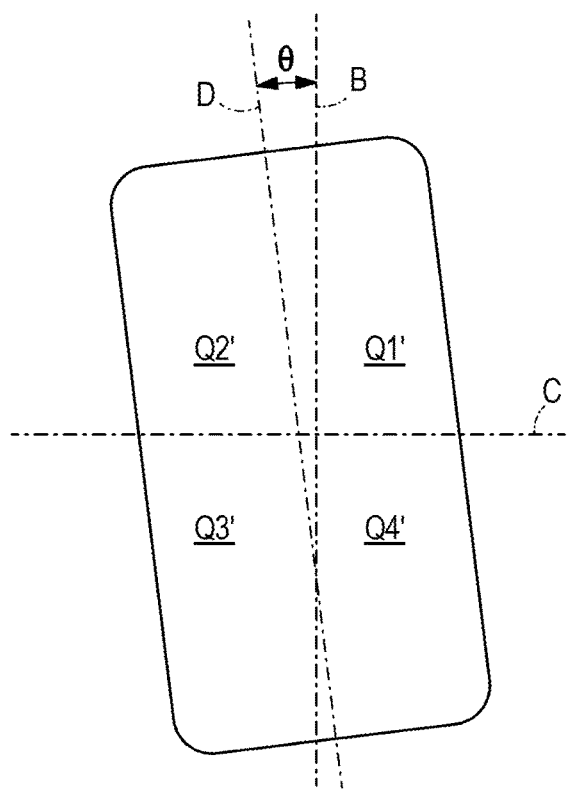
FIG. 5A depicts a schematic side view of one rolling element experiencing skew in a first direction.
Figure 5B:
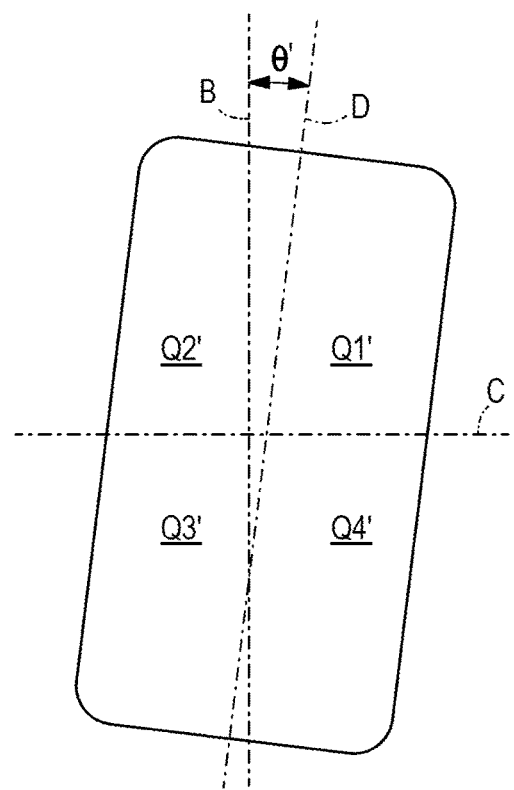
FIG. 5B depicts a schematic side view of one rolling element experiencing skew in a second direction.

In operation, the Rayleigh step arrays 52 located within each roller pocket 40 act to prevent the rolling element 12 within the pocket 40 from experiencing prolonged skew. Moreover, the Rayleigh step arrays 52 are configured to be activated by roller skew and, once activated, to counteract the skew with a hydrodynamic force generated in the lubricant at the Rayleigh step arrays 52. FIGS. 5A-5B schematically depict the two potential skew angles $\theta$, $\theta'$ of a rolling element 12. A third rolling element position corresponds to a skew angle of zero and is not illustrated. The skew angle $\theta$, $\theta'$ of the rolling element 12 is based on the direction of rotation of the bearing assembly 4. Only one direction of relative motion between a Rayleigh step array 52 and a rolling element 12 generates a hydrodynamic force F. To compensate for both potential directions of skew angle (i.e., angles $\theta$, $\theta''$), diagonally opposed Rayleigh step arrays 52 have the same geometric step directionality while adjacent Rayleigh step arrays 52 have opposite geometric step directionality. Thus, two adjacent Rayleigh step arrays 52 cannot be active at the same time—this would simply cause offsetting hydrodynamic forces F and the skew $\theta$, $\theta'$ will not be compensated for. A rolling element 12 that has a first skew angle $\theta$ (FIG. 5A) activates the Rayleigh step arrays 52 in the second and fourth quadrants Q2, Q4 while leaving the Rayleigh step arrays 52 in the first and third quadrants Q1, Q3 deactivated. The hydrodynamic forces F from the second and fourth quadrant Rayleigh step arrays 52 combine to create a force couple acting on the rolling element 12 to counter the skew angle $\theta$. The activated Rayleigh step arrays 52 may reduce the skew angle to an acceptable amount or eliminate the skew angle $\theta$ altogether. If the direction of rotation of the bearing assembly 4 is reversed, causing the rolling element 12 to experience a skew angle $\theta'$ (FIG. 5B), the second and fourth quadrant Q2, Q4 Rayleigh step arrays 52 remain deactivated while the first and third quadrant Q1, Q3 Rayleigh step arrays 52 are activated. If the rolling element 12 experiences little or no skew the Rayleigh step arrays 52 in all four quadrants Q1, Q2, Q3, and Q4 simply remain deactivated and the cage bridges 36 function in a conventional manner to maintain spacing of the rolling elements 12. The hydrodynamic force F generated by a Rayleigh step array 52 is a function of the relative velocity of the rolling element 12 and the Rayleigh step array 52. As the relative velocity increases, due to a greater rotational speed of the bearing assembly 4, the Rayleigh step array 52 generates a greater hydrodynamic force F. This effect allows the Rayleigh step array 52 to compensate for different magnitudes of rolling element skew based on the rotational speed of the bearing assembly 4. A bearing assembly with a high rotational speed will induce greater skew on the rolling elements 12. At the same time, the higher rotational speed will generate a greater hydrodynamic force from the active Rayleigh step arrays 52. Thus, the design of the cage 24 with at least one Rayleigh step array may render a bearing assembly that is otherwise unsuitable or unable to be rated for high speed operation, now suitable or rated for high speed operation. One such example is the use of a tapered rolling element bearing within an electric vehicle drivetrain.

Although the invention has been described in detail with reference to certain preferred embodiments, variations and modifications exist within the scope and spirit of one or more independent aspects of the invention as described.

Various features of the invention are set forth in the following claims.

What is claimed is:

1. A rolling element bearing assembly cage for spacing a plurality of rolling elements during operation of the rolling element bearing assembly about a central rotation axis, the cage comprising:
   a first axial end ring;
   a second axial end ring; and
   a plurality of bridges extending between the first axial end ring and the second axial end ring, the plurality of bridges defining a corresponding plurality of roller pockets therebetween, at least one of the plurality of bridges including a Rayleigh step array disposed on a surface thereof, the surface facing an interior of the roller pocket.

2. The cage of claim 1, wherein the roller pocket which the Rayleigh step array faces includes four quadrants, wherein the Rayleigh step array is disposed within a first of the quadrants, and wherein each of the other three quadrants includes a Rayleigh step array.

3. The cage of claim 1, wherein each of the plurality of roller pockets is tapered, and wherein the plurality of tapered roller pockets are configured to receive tapered rolling elements therein.

4. The cage of claim 1, wherein each of the plurality of roller pockets includes a Rayleigh step array.

5. A rolling element bearing assembly comprising a cage according to claim 1, the rolling element bearing assembly further comprising:
   an inner ring;
   an outer ring; and
   a plurality of rolling elements situated between the inner and outer rings and spaced circumferentially from each other by the plurality of bridges of the cage, the plurality of rolling elements configured to facilitate relative rotation between the inner ring and the outer ring.

6. A cage for spacing a plurality of rolling elements in a rolling element bearing assembly containing a working fluid, the cage comprising:
   a first axial end ring;
   a second axial end ring;
   a central rotation axis extending centrally through the first axial end ring and the second axial end ring; and
   a plurality of roller pockets spaced circumferentially about the cage, each of the plurality of roller pockets configured to receive a rolling element therein,
   wherein at least one of the plurality of roller pockets includes a Rayleigh step array that generates a hydrodynamic force within the working fluid in response to a skew angle between a rotational axis of the rolling element within the roller pocket and the central rotation axis.

7. The cage of claim 6, wherein the roller pocket having the Rayleigh step array includes four quadrants, and wherein each of the four quadrants includes a Rayleigh step array.

8. The cage of claim 7, wherein the Rayleigh step arrays in adjacent quadrants have opposite geometric step directionality.

9. The cage of claim 8, wherein each Rayleigh step array includes a plurality of distinct Rayleigh step geometries.

10. The cage of claim 9, wherein each Rayleigh step geometry within a Rayleigh step array has the same geometric step directionality.

11. The cage of claim 6, wherein each of the plurality of roller pockets includes a Rayleigh step array.

12. A rolling element bearing assembly comprising a cage according to claim 6, the rolling element bearing assembly further comprising:
   an inner ring;
   an outer ring; and
   a plurality of rolling elements disposed within the plurality of roller pockets, the plurality of rolling elements configured to facilitate relative rotation between the inner ring and the outer ring.

13. The rolling element bearing assembly of claim 12, wherein the plurality of rolling elements are tapered rolling elements, and wherein the plurality of roller pockets are tapered roller pockets.

14. The rolling element bearing assembly of claim 12, wherein each of the plurality of roller pockets includes a Rayleigh step array.

15. The rolling element bearing assembly of claim 12, wherein
   a first rolling element of the plurality of rolling elements is disposed within the at least one of the plurality of roller pockets,
   the Rayleigh step array is a first Rayleigh step array of a plurality of Rayleigh step arrays, the first Rayleigh step array is configured to generate a first hydrodynamic force on the first rolling element when the outer ring is rotated relative to the inner ring in a first direction, and
   a second Rayleigh step array of the plurality of Rayleigh step arrays is configured to generate a second hydrodynamic force on the first rolling element when the outer ring is rotated relative to the inner ring in a second direction, opposite the first direction, the second hydrodynamic force acting in a different direction than the first hydrodynamic force.

16. The rolling element bearing assembly of claim 15, wherein the first hydrodynamic force acts on the first rolling element in a different location than the second hydrodynamic force.

17. A method of operating a rolling element bearing assembly, the method comprising:
   providing an inner ring, an outer ring, a plurality of rolling elements disposed between the inner ring and the outer ring, and a cage configured to circumferentially space the plurality of rolling elements about the rolling element bearing assembly, the cage including a plurality of roller pockets in which the plurality of rolling elements are located, at least one of the plurality of roller pockets including a Rayleigh step array;
   imparting relative rotation between the outer ring and the inner ring to set the plurality of rolling elements in rolling contact with the outer ring and the inner ring, the rotation imparting skew to at least one of the plurality of rolling elements; and
   in response to the skew of the at least one of the plurality of rolling elements, generating a skew counteracting hydrodynamic force on at least one of the plurality of rolling elements with the Rayleigh step array.

18. The method of claim 17, wherein each of the plurality of roller pockets includes a Rayleigh step array, each of the Rayleigh step arrays generating a skew counteracting hydrodynamic force on the plurality of rolling elements in response to the skew of the plurality of rolling elements.

19. The method of claim 17, wherein the outer ring includes a rib configured to secure the plurality of rolling elements between the outer ring and the inner ring, the rib imparting the skew to the plurality of rolling elements during rotation.

* * * * *